US009376929B2

(12) United States Patent
Inomata et al.

(10) Patent No.: US 9,376,929 B2
(45) Date of Patent: Jun. 28, 2016

(54) TURBINE GENERATOR

(71) Applicant: IHI Corporation, Koto-ku (JP)

(72) Inventors: Tatsumi Inomata, Tokyo (JP); Kaoru Kaneko, Tokyo (JP)

(73) Assignee: IHI Corporation, Koto-ku (JP)

( * ) Notice: Subject to any disclaimer, the term of this patent is extended or adjusted under 35 U.S.C. 154(b) by 0 days.

(21) Appl. No.: 14/531,240

(22) Filed: Nov. 3, 2014

(65) Prior Publication Data

US 2015/0048618 A1     Feb. 19, 2015

Related U.S. Application Data

(63) Continuation of application No. PCT/JP2013/066732, filed on Jun. 18, 2013.

(30) Foreign Application Priority Data

Jun. 21, 2012    (JP) ................................ 2012-139534

(51) Int. Cl.
    *F01D 15/10*     (2006.01)
    *F01D 25/16*     (2006.01)
    *F01D 11/00*     (2006.01)

(52) U.S. Cl.
    CPC ............... *F01D 15/10* (2013.01); *F01D 11/00* (2013.01); *F01D 25/16* (2013.01); *F05D 2260/60* (2013.01)

(58) Field of Classification Search
    CPC ...................................................... F01D 15/10
    USPC ............................................................ 290/52
    See application file for complete search history.

(56) References Cited

U.S. PATENT DOCUMENTS

| | | | | |
|---|---|---|---|---|
| 4,253,031 | A | * | 2/1981 | Frister ............................ 290/52 |
| 5,789,825 | A | * | 8/1998 | Selfors et al. ................... 290/52 |
| 5,818,117 | A | * | 10/1998 | Voss et al. .................... 290/40 A |
| 6,198,174 | B1 | * | 3/2001 | Nims et al. ....................... 290/52 |
| 6,739,845 | B2 | * | 5/2004 | Woollenweber .............. 417/407 |
| 2010/0060006 | A1 | | 3/2010 | Ichimaru et al. |
| 2012/0027567 | A1 | * | 2/2012 | Agrawal et al. .................. 415/1 |
| 2013/0142636 | A1 | * | 6/2013 | Parker .......................... 415/185 |

FOREIGN PATENT DOCUMENTS

| | | |
|---|---|---|
| JP | 59-94130 U | 6/1984 |
| JP | 7-19066 | 11/1988 |
| JP | 63-277801 | 11/1988 |

(Continued)

OTHER PUBLICATIONS

International Search Report issued on Jul. 30, 2013 for PCT/JP2013/066732 filed on Jun. 18, 2013 with English Translation.

(Continued)

*Primary Examiner* — Joseph Waks
(74) *Attorney, Agent, or Firm* — Oblon, McClelland, Maier & Neustadt, L.L.P.

(57) ABSTRACT

A turbine generator includes a bearing device configured to rotatably support a rotor inside a housing. The bearing device separates an internal space of the housing from its outside. Communicating portions are formed in the bearing device. The communicating portions are formed in regions which are out of contact with lubricant. Each communicating portion establishes communication between the internal space of the housing and its outside.

2 Claims, 3 Drawing Sheets

(56) References Cited

FOREIGN PATENT DOCUMENTS

| JP | 5-118339 A | 5/1993 |
| JP | 10-169781 A | 6/1998 |
| JP | 2004-84716 A | 3/2004 |
| JP | 2010-203347 A | 9/2010 |
| JP | 2010-242551 A | 10/2010 |
| JP | 2010242551 A * | 10/2010 |
| JP | 2012-149540 A | 8/2012 |

OTHER PUBLICATIONS

International Written Opinion mailed on Jul. 30, 2013 for PCT/JP2013/066732 filed on Jun. 18, 2013.

Japanese Office Action issued in Application No. 2012-139534 on Mar. 29, 2016.

* cited by examiner

TURBINE GENERATOR

CROSS REFERENCE TO RELATED APPLICATIONS

This application is a continuation application of International Application No. PCT/JP2013/066732, filed on Jun. 18, 2013, which claims priority to Japanese Patent Application No. 2012-139534, filed on Jun. 21, 2012, the entire contents of which are incorporated by references herein.

BACKGROUND OF THE INVENTION

1. Field of the Invention

The present invention relates to a turbine generator.

2. Description of the Related Art

There have been proposals in recent years that a turbine generator configured to generate power by use of exhaust heart from an internal combustion engine be mounted on vehicles and the like for the purpose of efficient use of the energy.

An apparatus in line with the proposals includes: a heat exchanger disposed upstream of a radiator; a pump configured to supply a liquid heating medium to the heat exchanger; a turbine generator configured to generate power by use of the heating medium evaporated by the heat exchanger; and a condenser configured to liquefy the gaseous heating medium discharged from the turbine generator, and to supply the liquefied heating medium to the pump. A coolant circulates between the internal combustion engine and the radiator for the purpose of cooling the internal combustion engine. The coolant cools the internal combustion engine, and thereafter the resultant high-temperature coolant is sent to the radiator. The heat exchanger exchanges the heat between the high-temperature coolant and the liquid heating medium supplied by the pump. This heat exchange evaporates the heating medium. The evaporated heating medium is supplied to a turbine in the turbine generator. The turbine is rotationally driven by the supplied heating medium. As a consequence, power is generated. The heating medium discharged from the turbine is supplied to the condenser. The condenser liquefies the heating medium, and supplies the liquefied heating medium to the heat exchanger again.

The foregoing turbine generator includes: a rotor having rotary shafts on its two sides, respectively; a stator disposed surrounding the outer periphery of the rotor; the turbine mounted on one of the rotary shafts; a housing configured to house the rotor and the stator in its internal space; and a bearing device installed in the housing, and including a first bearing rotatably supporting one of the rotary shafts, and a second bearing rotatably supporting the other rotary shaft. A first vent hole to eliminate a pressure difference between the turbine and rotor sides of the first bearing is drilled in the housing. Furthermore, a second vent hole to eliminate a pressure difference between the rotor and counter-rotor sides of the second bearing is drilled in the housing. The first and second vent holes extend in directions inclined from the axial direction of the bearing device, respectively.

Since the first vent hole is formed, the turbine and rotor sides of the first bearing communicate with each other, and no pressure difference accordingly occurs between them. In other words, the pressure on the turbine side of the first bearing does not become higher than the pressure on the rotor side of the first bearing. This avoids leakage and resultant dispersion of grease contained inside the first bearing, and makes the first bearing operate smoothly. Moreover, since the second vent hole is formed, the rotor and counter-rotor sides of the second bearing communicate with each other, and no pressure difference accordingly occurs between them. In other words, the pressure on the rotor side of the second bearing does not become higher than the pressure on the counter-rotor side of the second bearing. This avoids leakage and resultant dispersion of grease contained inside the second bearing, and makes the second bearing operate smoothly.

It should be noted that a technology related to the foregoing turbine generator has been described in Japanese Patent Application Laid-Open Publication No. 2010-242551 (JP 2010-242551 A).

SUMMARY OF THE INVENTION

It has been observed, however, that heat produced by the rotor, the stator and the bearing device in the turbine generator makes pressure become higher in a housing internal space separated by the first bearing and in a housing internal space separated by the second bearing than outside the housing internal spaces.

The bearings used as the first and second bearings in the turbine generator are employed with their maintainability taken into consideration. To put it concretely, bearings each including a non-contact shield are employed as the bearings which can satisfy this need. The non-contact shield is one means for preventing the leakage of lubricant contained (put, filled) inside a bearing, and is known as a mechanism which can achieve longer product life than that of a contact lip seal. Nevertheless, once the pressure difference occurs between the inside and outside of the housing which are separated by the first bearing, air is likely to flow through a small gap between the non-contact shield and the inner ring of the bearing. In this case, the lubricant may leak from the first bearing. The similar applies to a case where the pressure difference occurs between the inside and outside of the housing which are separated by the second bearing. The vent holes disclosed in JP 2010-242551 A eliminate these pressure differences, and thus prevent the leakage of the lubricant.

An object of the present invention is to provide a turbine generator which achieves longer product life by preventing the leakage of lubricant from the bearings.

An aspect of the present invention provides a turbine generator which includes: a rotor having rotary shafts on its two sides, respectively; a stator disposed surrounding an outer periphery of the rotor, and constituting a power generator in conjunction with the rotor; a turbine mounted on one of the rotary shafts; a housing configured to house the rotor and the stator inside its internal space; a bearing device installed in the housing, and configured to rotatably support the rotary shafts of the rotor; and a communicating portion formed in the bearing device, and configured to make a pressure in the internal space of the housing equal to a pressure outside of the internal space which is separated by the bearing device.

The bearing device may include: a bearing including an outer ring and an inner ring; and a sleeve fittingly attached to an outer periphery of the bearing. In this case, the communicating portion may be formed in any of an outer periphery of the sleeve, an inner periphery of the sleeve, an outer periphery of the outer ring of the bearing, and an inner periphery of the inner ring of the bearing.

The communicating portion may be formed as a groove extending in an axial direction of the bearing device.

The present invention can provide a turbine generator which achieves longer product life by preventing leakage of lubricant from a bearing.

DESCRIPTION OF THE PREFERRED EMBODIMENTS

Referring to the accompanying drawings, descriptions will be provided for an embodiment of the present invention.

Figure 1:
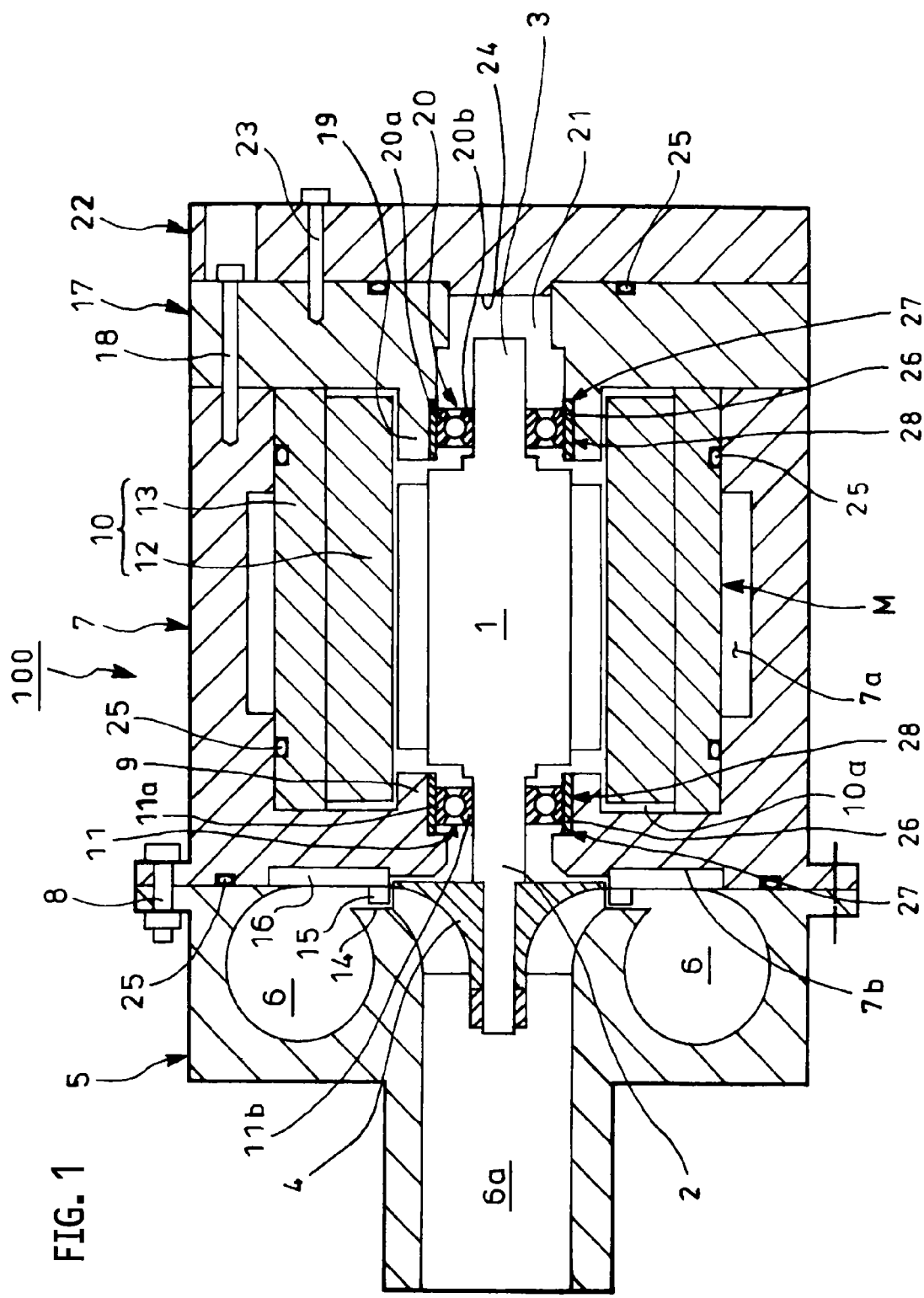
FIG. 1 is a side cross-sectional view showing a turbine generator of an embodiment of the present invention.
Figure 2A:
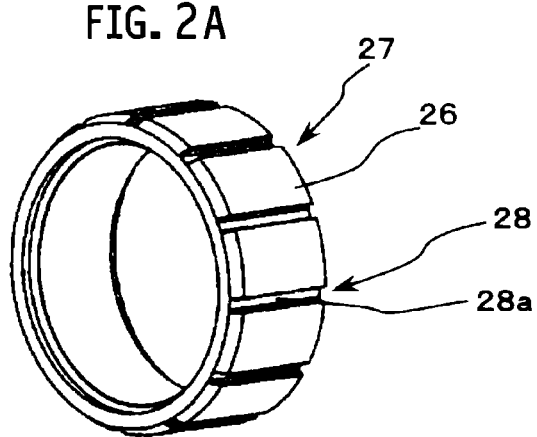
FIG. 2A is a perspective view showing an example of a sleeve in the turbine generator shown in FIG. 1, which includes grooves, as communicating portions, formed in an outer periphery of the sleeve.
Figure 2B:
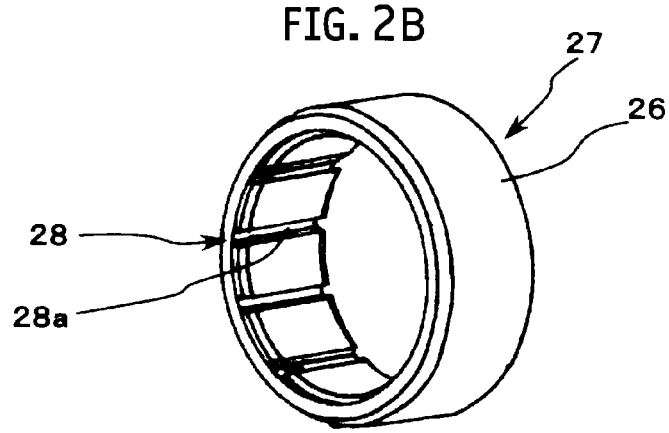
FIG. 2B is a perspective view showing an example of the sleeve in the turbine generator shown in FIG. 1, which includes grooves, as communicating portions, formed in an inner periphery of the sleeve.
Figure 2C:
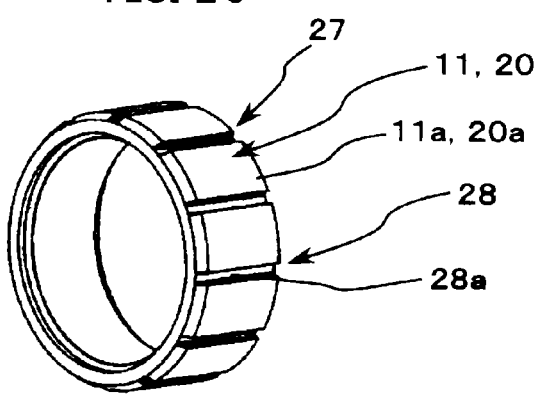
FIG. 2C is a perspective view showing an example of a bearing in the turbine generator shown in FIG. 1, which includes grooves, as communicating portions, formed in an outer periphery of an outer ring of a bearing.
Figure 2D:
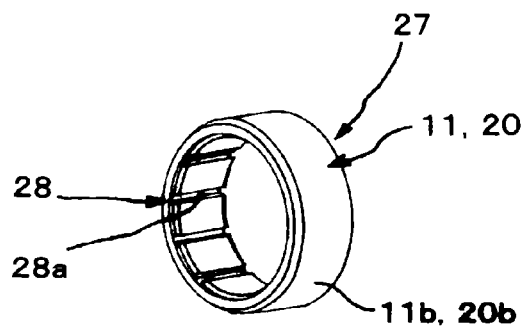
FIG. 2D is a perspective view showing an example of the bearing in the turbine generator shown in FIG. 1, which includes grooves, as communicating portions, formed in an inner periphery of an inner ring of the bearing.
Figure 3:
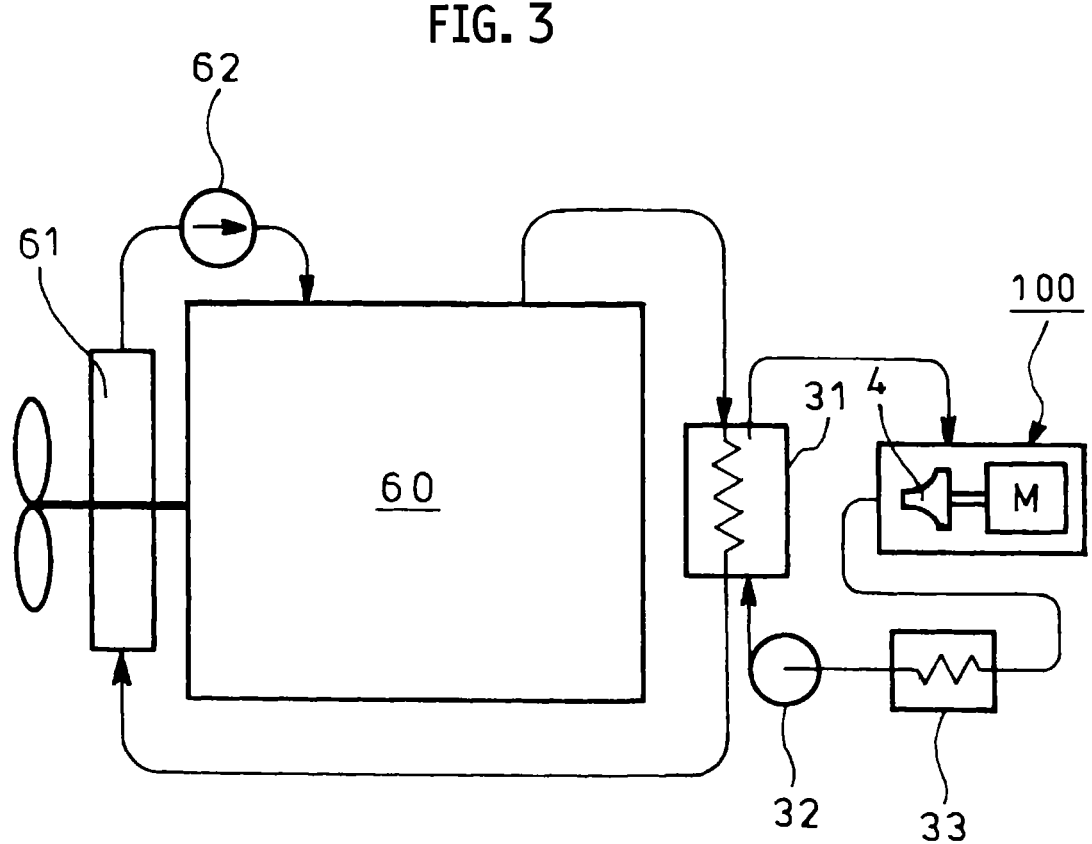
FIG. 3 is an overall schematic configuration diagram showing an example in which the turbine generator is installed in an internal combustion engine.

FIGS. 1 to 3 show a turbine generator 100 of the embodiment and examples of its application. As shown in FIG. 1, the turbine generator 100 includes: a rotor 1 and a stator 10 which constitute a power generator M; and a turbine 4. The rotor 1 has rotary shafts 2, 3 on its two sides, respectively. The turbine 4 is integrally and fittingly mounted on the rotary shaft 2 on one side of the rotor 1. The stator 10 is formed surrounding the rotor 1, and is made from: a sub-stator 12 on an inner side; and a sleeve 13 on an outer side. The sub-stator 12 includes coils each configured to generate an induced current in response to the rotation of the rotor 1. The length of the sleeve 13 in an axial direction is longer than that of the sub-stator 12. It should be noted that the relationship between the lengths does not limit the invention. The turbine generator 100 further includes a turbine housing 5 configured to house the turbine 4. The turbine housing 5 includes: a scroll passage 6 configured to guide a working fluid to the turbine 4; and a discharge passage 6a configured to discharge the working fluid after the working fluid rotationally drives the turbine 4. Incidentally, the pressure of the working fluid decreases once the working fluid is discharged from the turbine 4.

The turbine generator 100 includes a stator housing 7 which is integrally assembled with the turbine housing 5 by use of a fixing bolt 8. The stator housing 7 includes a protrusion 9. An inner peripheral portion of the protrusion 9 faces the rotary shaft 2, and projects closer to the rotary shaft 2 of the rotor 1. In addition, the inner peripheral portion of the protrusion 9 extends in parallel with the center axis of the rotor 1, and toward the inside of the stator housing 7. Accordingly, this portion projects in an annular shape along the axis of the rotor 1. The protrusion 9 having the above-described shape forms a stator housing portion 10a configured to house and hold one end portion (a left-side end portion in the example shown in FIG. 1) of the stator 10 on the turbine housing 5 side. Moreover, a bearing (a first bearing) 11 is disposed between the inner peripheral portion of the protrusion 9 and the rotary shaft 2. The bearing 11 is fixed to the inner peripheral portion of the protrusion 9 by use of a sleeve 26, which will be described later. The bearing 11 rotatably supports the rotary shaft 2.

The stator housing 7 has an end surface which faces the turbine housing. A fitting recessed portion 7b shaped like a ring is formed in the end surface of the stator housing 7. An annular plate 16 is disposed in the fitting recessed portion 7b. In addition, multiple vanes 15 are fixed to this plate 16. These vanes 15 are arranged in a circumferential direction of the plate 16, and are opposed to a nozzle portion 14 configured to guide the working fluid in the scroll passage 6 to the turbine 4 from the circumferential direction. When the turbine housing 5 and the stator housing 7 are assembled together, the plate 16 is held therebetween.

A bearing flange 17 is integrally assembled with the stator housing 7 by use of a fixing bolt 18. The bearing flange 17 includes a protrusion 19. The protrusion 19 is shaped like a cylinder. Inside an end portion (a right-side end portion in the example shown in FIG. 1) of the stator 10 opposite from the turbine housing 5, the protrusion 19 projects in parallel with the axial direction of the rotor 1, and toward the inside of the stator housing 7. In addition, a bearing (a second bearing) 20 is disposed between the rotary shaft 3 and an inner peripheral portion of the protrusion 19 which faces the rotary shaft 3. The bearing 20 is fixed to the inner peripheral portion of the protrusion 19 by use of the sleeve 26 to be described later. The bearing 20 rotatably supports the rotary shaft 3. Furthermore, the bearing flange 17 has an opening 21 which penetrates through the bearing flange 17 at a position corresponding to the rotary shaft 3.

A lid member 22 is integrally assembled with the bearing flange 17 by use of a fixing bolt 23. The lid member 22 includes a projecting portion 24 which is fitted into the opening 21 by projecting in a way to close the opening 21 in the bearing flange 17. Seal members 25 are each formed from a seal ring or the like. The seal members 25 are provided between the turbine housing 5 and the stator housing 7, between the outer periphery of the stator 10 and the stator housing 7, as well as between the bearing flange 17 and the lid member 22. The seal member 25 provided between the outer periphery of the stator 10 and the stator housing 7 seals in cooling water which flows through a cooling water passage 7a for the stator 10 formed in the stator housing 7 via an inlet and an outlet (not illustrated).

The turbine generator 100 of the embodiment has a compact shape which makes the turbine generator 100 easy to assemble. The turbine generator 100 is applicable to, for example, an internal combustion engine 60 shown in FIG. 3. As shown in this drawing, a pump 62 circulates coolant between the internal combustion engine 60 and a radiator 61 for the purpose of cooling the internal combustion engine 60. The coolant cools the internal combustion engine 60, and thereafter, the resultant high-temperature coolant is sent to the radiator 61. A heat exchanger 31 is disposed upstream of the radiator 61. The heat exchanger 31 exchanges heat between this high-temperature coolant and a liquid heating medium which is supplied by the pump 32. This heat exchange evaporates the heating medium. The evaporated heating medium is supplied to the turbine 4 in the turbine generator 100. The supplied heating medium rotationally drives the turbine 4. As a result, the power generator M generates electric power. The heating medium discharged from the turbine 4 is supplied to a condenser 33. The condenser 33 liquefies the heating medium, and supplies the liquefied heating medium to the heat exchanger 31 again.

The stator housing 7 is made from aluminum. The bearings 11, 20 are made from bearing steel. Sliding vibration at minute amplitude that causes intensive wear, or so-called fretting, occurs at a portion where each of the bearings 11, 20 is fitted in the stator housing 7. For this reason, the sleeve 26 is fittingly attached to the outer peripheries of the bearings 11, 20 for the purpose of preventing the fretting. In other words, the bearings 11, 20 and the sleeve 26 constitute a bearing device 27 of the embodiment. Furthermore, communicating portions 28 are formed in the bearing device 27. Each communicating portion 28 establishes communication between the internal space of the stator housing 7 and the outside of the internal space which is separated by the bearing device 27.

As shown in FIG. 2A, for example, the communicating portions 28 can be formed by providing the outer periphery of the sleeve 26 with grooves 28a which extend in its axial direction. The outer periphery of the sleeve 26 is a region which is out of contact with lubricant contained (put, filled) inside the bearing device 27.

As shown in FIG. 2B, for example, the communicating portions 28 may be formed by providing the inner periphery of the sleeve 26 with the grooves 28a which extend in its axial direction. The inner periphery of the sleeve 26 is also a region which is out of contact with the lubricant contained (put, filled) inside the bearing device 27.

As shown in FIG. 2C, for example, the communicating portions 28 may be formed by providing the outer peripheries of outer rings 11a, 20a of the bearings 11, 20 with the grooves 28a which extend in its axial direction. Alternatively, as shown in FIG. 2D, the communicating portions 28 may be formed by providing the inner peripheries of inner rings 11b, 20b of the bearings 11, 20 with the grooves 28a which extend in its axial direction. The outer peripheries of the outer rings 11a, 20a of the bearings 11, 20, as well as the inner peripheries of the inner rings 11b, 20b of the bearings 11, 20 are also regions which are out of contact with the lubricant contained (put, filled) inside the bearing device 27.

It should be noted that the shapes of the communicating portions 28 are not limited to the grooves 28a shown in FIGS. 2A to 2D. The grooves 28a may have a bottom surface whose cross section is shaped like an arc, for example. Furthermore, the communicating portions 28 may be shaped like a wave whose ridge and trough lines extend in the axial direction of the sleeve 26, in the outer periphery or the inner periphery of the sleeve 26. The same applies to the outer peripheries of the outer rings 11a, 20a and the inner peripheries of the inner rings 11b, 20b.

Next, descriptions will be provided for how the embodiment works.

As described above, the communicating portions 28 are formed in the regions in the bearing device 27 which are out of contact with the lubricant. In addition, each communicating portion 28 establishes the communication between the internal space of the stator housing 7 and the outside of the internal space which is separated by the bearing device 27. Thereby, the internal space of the stator housing 7 and the outside of the internal space, which is separated by the bearing device 27, are spatially connected to each other. This makes the pressures of the internal space and its outside equal.

The bearings used as the bearings 11, 12 in the turbine generator 100 are employed with their maintainability taken into consideration. To put it concretely, bearings each including a non-contact shield are employed as the bearings which can satisfy this need. The non-contact shield is one means for preventing the leakage of lubricant contained (put, filled) inside the bearing, and is known as a mechanism which can achieve longer product life than that of a contact lip seal. Furthermore, the non-contact shield is suitable particularly for the rotor 1 which is expected to rotate at high speed.

Once the turbine generator 100 comes into operation, the rotor 1, the stator 10 and the bearing device 27 are heated. For this reason, the pressure in the internal space of the stator housing 7 which is separated by the bearing 11, and the pressure in the internal space of the stator housing 7 which is separated by the bearing 20 are likely to rise due to the heat. Since, however, the communicating portions 28 are formed in the bearing device 27, each of the internal spaces is spatially connected to its outside, and the gas accordingly flows through the communicating portions 28 freely. This prevents occurrence of a pressure difference between each internal space and its outside. As a result, the air is prevented from flowing in the vicinity of the non-contact shield, and the lubricant is accordingly prevented from leaking from the bearings 11, 20. For this reason, the present invention extends the product life of the turbine generator, or a time interval until its next maintenance. In short, the present invention can provide the turbine generator which achieves longer product life.

Furthermore, since the communicating portions 28 are formed in the bearing device 27, no vent holes need to be formed in the housing, unlike in conventional turbine generators. The bearing device 27 is relatively smaller and easier to process than the housing 7. For this reason, the formation of the communicating portions 28 is easier than formation of vent holes, which have the same function as the communicating portions 28, in the housing 7 or the rotor 1. Accordingly, the turbine generator 100 of the present invention can be constructed more easily than turbine generators having the vent holes in the housing.

It should be noted that the present invention is not limited to the foregoing embodiment. It is a matter of course that various modifications can be made to the present invention within the scope not departing from the gist of the present invention.

What is claimed is:

1. A turbine generator comprising:
   a rotor having rotary shafts on its two sides, respectively;
   a stator disposed surrounding an outer periphery of the rotor, and constituting a power generator in conjunction with the rotor;
   a turbine mounted on one of the rotary shafts;
   a housing configured to house the rotor and the stator inside its internal space;
   a bearing device installed in the housing, and configured to rotatably support the rotary shafts of the rotor; and
   a communicating portion formed in the bearing device, and configured to make a pressure in the internal space of the housing equal to a pressure outside of the internal space which is separated by the bearing device,
   wherein the caring device comprises:
      a bearing including an outer ring and an inner ring; and
      a sleeve fittingly attached to an outer periphery of the bearing, and
   wherein the communicating portion is formed in one of an outer periphery of the sleeve, an inner periphery of the sleeve, an outer periphery of the outer ring of the bearing, and an inner periphery of the inner ring of the bearing.

2. The turbine generator according to claim 1, wherein the communicating portion is formed as a groove extending in an axial direction of the bearing device.

* * * * *